Patented Mar. 27, 1951

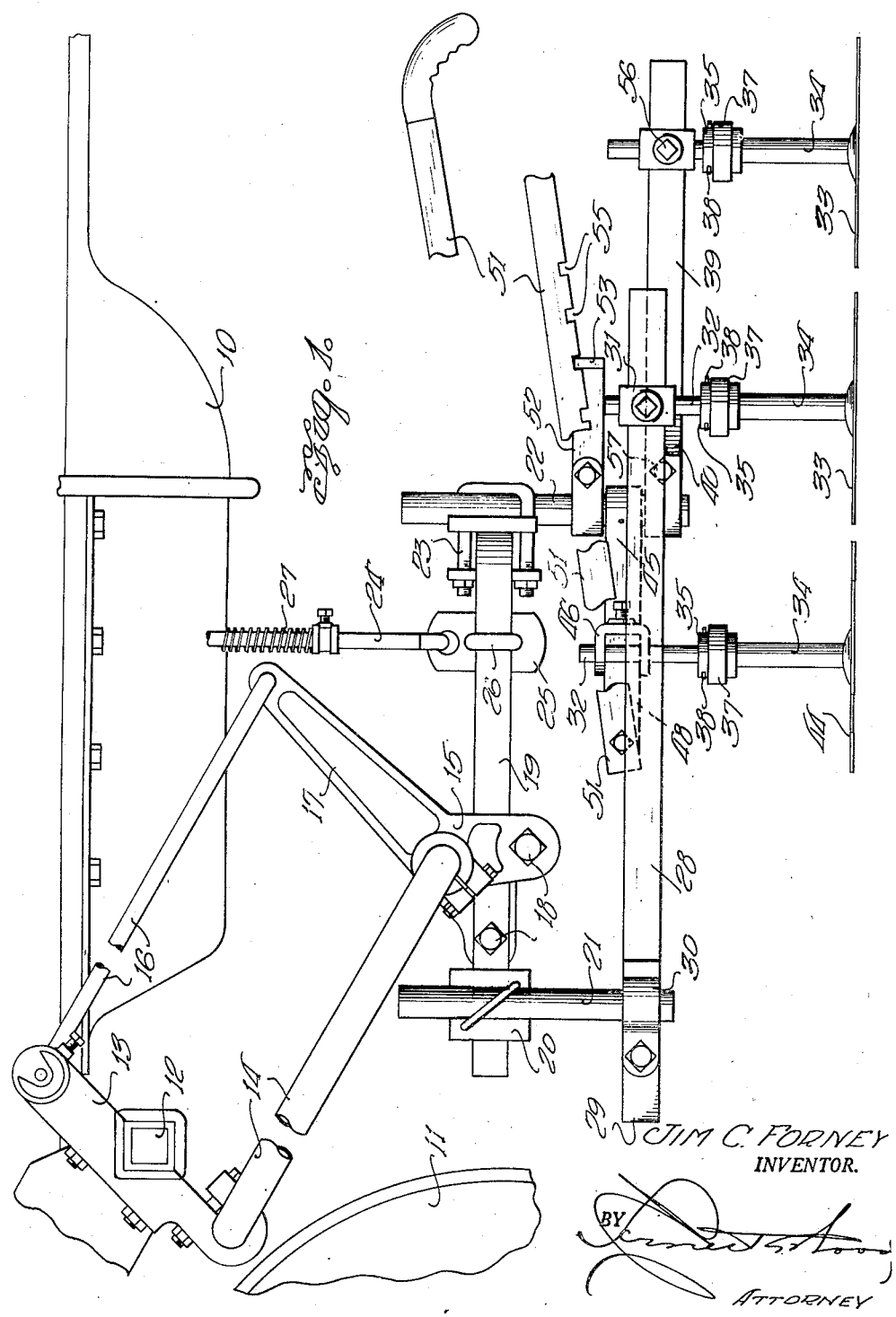

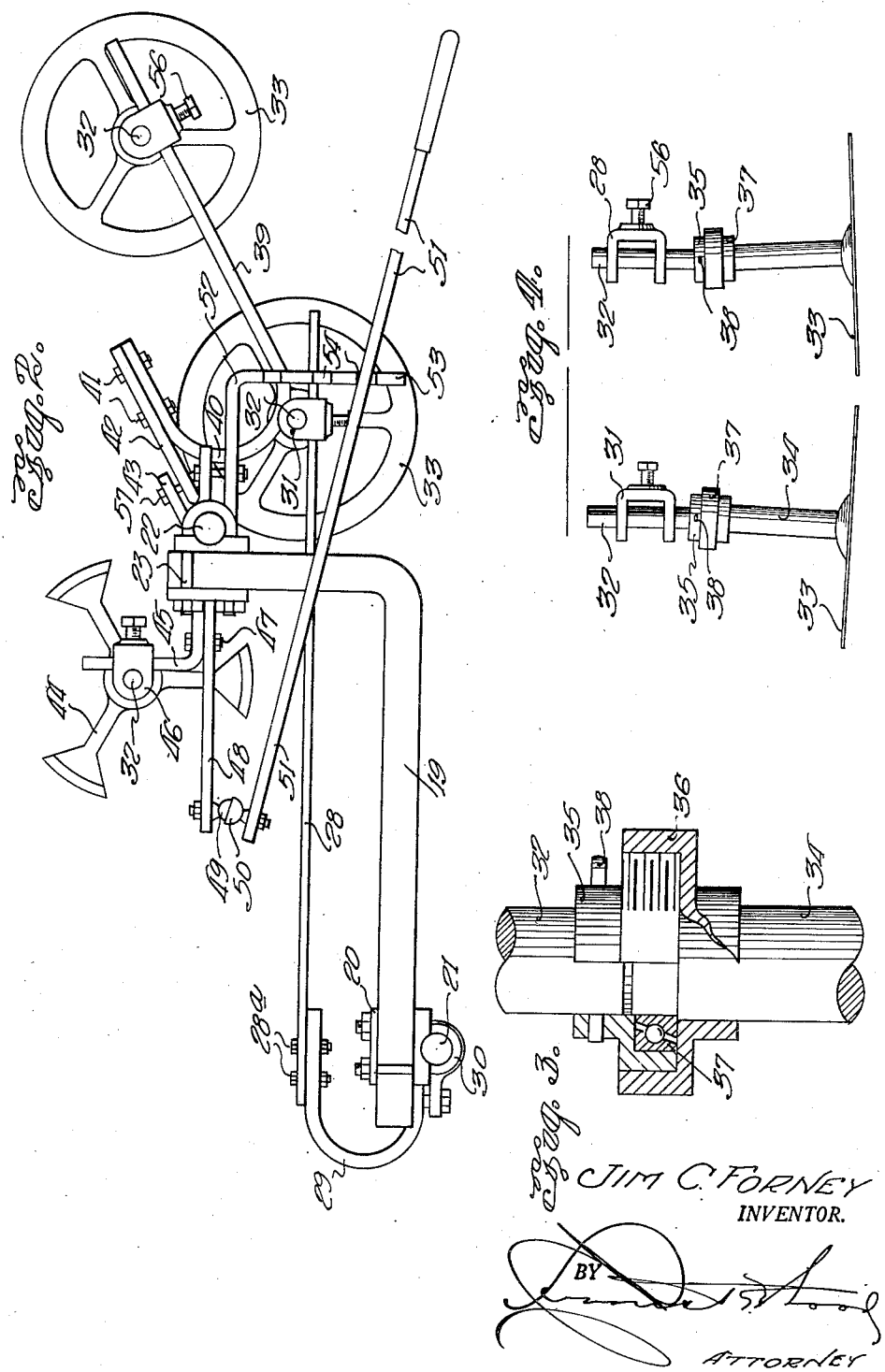

2,546,260

UNITED STATES PATENT OFFICE 2,546,260

ROTARY PLANT CHOPPER AND CULTIVATOR

Jim C. Forney, Chilton, Tex.

Application March 22, 1946, Serial No. 656,282

5 Claims. (Cl. 97—17)

This invention relates to agricultural implements and more particularly to implements for weeding row crops.

The principal object of the invention is to provide an attachment for tractors or cultivators, which is automatic in its operation and highly effective for eradicating or cutting pest vegetation from productive row crops such as cotton. It being desirable and sometimes essential that predeterminately spaced stands of the cultivated crop be preserved, the invention is equipped with discs or circular shovels freely mounted on separate axles inclined to the vertical and operatively spaced diagonally of a row to dislodge the roots of noxious vegetation infesting the cotton. A rotary cutting element follows in the path of the disc and is provided with radial blades which latter are effective to pass athwart the row to remove not only the noxious weeds but also stalks of cotton, thereby leaving the latter in predeterminately spaced stands, comparatively free of weeds.

Another object of the invention is to provide cooperative disc shovels disposed rotatably on inclined axes so that their frictional engagement with the soil will cause them to revolve. The discs are possessed of blunt, non-cutting edges between which the cotton is constrained to pass, but the tender roots of the pest vegetation in comparison with the tough roots of the cultivated plants will yield to the thrust of the discs and will be uprooted while the plants will resist such action.

Still another object of the invention is to provide cooperative disc shovels and a rotary cutting element, combined with means for raising and lowering the entire assembly and means for changing the positions of the discs and cutting element with respect to the plant row for varying the effects thereof on the plants and weeds.

With the foregoing object as paramount, the invention has further reference to certain features of accomplishment which will become apparent as the description proceeds, taken in connection with the accompanying drawing wherein:

Figure 1 is a side elevational view of a weeding attachment constructed according to the invention shown mounted on a tractor, the latter being fragmentarily shown.

Figure 2 is a plan view of the invention, per se.

Figure 3 is a fragmentary view of a typical suspension assembly for the disc shovels and cutter, showing a bearing partially broken away, and Figure 4 is a detail view of the pair of disc shovels per se in operative relationship.

Continuing with a more detailed description of the drawings, reference is primarily made to Figure 1 wherein numeral 10 denotes generally the lower portion of a tractor and 11, a front wheel thereof, to illustrate the position of the attachment when secured to a tractor as the draft implement.

A conventional cultivator mounting is employed for supporting the weeding attachment of the invention and which consists of a rotatable shaft 12, carrying an arm 13, to one end of which is pivoted a link 14, supporting a bracket 15 while a rod 16 is connected to the opposite end of arm 13 and extends downwardly and is pivotally joined to the end of a lever 17 formed on the bracket 15.

The bracket 15 is secured by bolts 18 to a horizontal, substantially L-shaped member 19 to which is clamped at 20 a post 21. Companion to the post 21 is a second post 22, secured to the opposite end of member 19 by means of a clamp 23. Supporting the member 19 adjacent its rearmost end is a vertical rod 24, pivotally connected to a plate 25 which latter is secured to the member 19 by means of a clamp 26. The upper portion of the supporting rod 24 is broken away but conventionally, it is so connected to the frame of the tractor that the spring 27 surrounding the rod will function to yieldingly resist vertical displacement of the rearmost end of the mounting members 19.

It is obvious from the foregoing that when the square shaft 12 is oscillated by means of a suitable lever (not shown) accessible to an operator on the seat of the tractor, the link 14 and rod 16 cooperate to raise the mounting bar 19 and consequently any implement supported thereby.

The present invention consists of an elongated bar 28, the front end of which is bolted at 28a to a substantially U-shaped member 29 and extends rearwardly to lie under and parallel with the mounting bar 19. The opposite leg of the U-shaped member 29 is secured by means of a clamp 30 to the lower end of the foremost post 21.

Adjacent to the rear end of the bar 28 is an adjustable clamp 31 having vertically aligned apertures which receive a stub shaft 32, forming part of the suspension means of a disc shovel 33. As a continuation of the suspension means, a shank 34 is provided, to the lower end of which the disc shovel 33 is secured. In order to so dispose the shovel that it will engage the ground only at one side, the axis of the shank 34 is inclined to that of its supporting shaft 32. This inclination is brought about by the specially constructed bearing assembly shown in Figure 3, which bearing also permits the shank and shovel to rotate on the shaft 32. The bearing consists of a flanged collar 35 which is received in a correspondingly shaped flanged collar 36 mounted on the upper end of the shank 34, the said collars interposing a frictionless bearing 37. Figure 3 does not show the relatively inclined position of the shank 34 but in Figure 4, the collars 35 are disclosed as being affixed by means of a cotter key 38 at an angle to the axis of the stub shaft 32.

Disposed rearwardly and to one side of the disc shovel just described is an identical shovel 33, the latter bearing the same reference numeral for the reason that it is identical to and interchangeable with said first shovel. This is true also of the associated parts, namely, the suspension shaft 32; clamp 31; bearing assembly 35, 36, and 37; and the shank 34.

The mounting for the rearwardly disposed disc shovel consists of a bar 39, extending obliquely with respect to the bar 28 and in a rearwardly direction. In being mounted on the rearmost end of the bar 39, the disc shovel last mentioned is disposed on the side of a row of plants opposite the first mentioned disc shovel but the ground engaging edges of the shovels overreach the center of the row, hence the plants are engaged by each of the shovels as the attachment is drawn along the row. It will be remembered, however, that the edges of the discs or shovels, so called, are unsharpened and are purposely blunt so that they will not inflict damage to the stalks. The stalks, especially of cotton, are more rugged than the pest weeds which quickly spring up about them and they may be subjected to the thrusts of the shovels 33 and will suffer no ill effects. This is not true, however, of the more tender pest vegetation which is easily uprooted by the shovels, and is carried to a point between the rows by the shovels 33.

The mounting bar 39 which carries the rearmost shovel 33 has a bend 40 therein to lend resiliency to the said bar 39, the extremity of the bend being bolted at 41 to an angular bar 42 which is clamped to the foremost post 22 through the medium of a clamp 43.

Cooperating with the disc shovels 33 is a rotary cutting element consisting of radial blades 44. Inasmuch as the mounting for the cutting element is identical to the mounting for the disc shovels 33, the same characters of reference are used to denote like parts throughout. However, the cutting element is mounted on the post 22 independently of the disc shovels 33 in order that it may be independently adjustable. The mounting for the cutter consists of a substantially L-shaped bar 45, to which is attached a clamp 46 which latter secures the shaft 32 of the cutter to the said bar 45.

The bar 45 is secured by means of bolts 47 (Fig. 2) to a bar 48 which latter extends forwardly of the said shaft 22 and carries on its end a ball 49, which receives a socket 50, carried by the end of a lever 51, which latter extends rearwardly to a point accessible to the operator on the seat of the tractor.

As a means for holding the cultivator in laterally adjustable positions with respect to a row of vegetation, a substantially L-shaped bar 52 is shown clamped at one end to the said shaft 22, the opposite end 53 being disposed above and at right angles to the rear end of the bar 28 and is provided with spaced recesses 54 which selectively receive the recesses 55 in the lever 51, after adjustment of the rearmost member 33, which is accomplished by loosing bolt 57 which holds the bar 39, carrying the member, in fixed relation to the shaft 27. A set screw 56 is provided for each of the clamps 31 to hold the same in adjusted positions on their respective shafts 32 to correspondingly adjust the discs 33 with respect to the ground.

What is claimed is:

1. A weeding and plant thinning attachment for tractors including a vertically movable frame, a pair of relatively spaced shafts suspended from said frame and inclined to the vertical, a disc mounted on the lower end of each of said shafts, the edges of said discs being blunt and slightly overlapping and adapted to agitate soil on opposite sides of and across a row of plants, a third shaft depending from said frame forwardly of said first shafts and a rotary cutting element mounted on said third shaft having radial blades adapted to cut successive swaths in said row of plants to eliminate surplus plants and intervening weeds.

2. A weeding and plant thinning attachment for draft implements, including a frame attached to said draft implement for vertical displacement, a pair of spaced apart shafts suspended from said frame having outwardly divergent lower ends, a disc mounted on the lower end of each of said shafts, the edges of said discs being disposed inwardly of a line between the axes of said discs for agitating soil on each side of a row of plants, a third shaft disposed forwardly of said first shafts and a multi-bladed element mounted on said third shaft and rotated by ground friction for cutting swaths from said row of plants as said attachment is drawn along the same.

3. A cotton weeding and chopping attachment for tractors including a vertically adjustable frame, a pair of shafts suspended from said frame, a weeding disc on the lower end of each of said shafts disposed to lie on a plane inclined to the horizontal on each side of a row of plants and rotatable by frictional engagement with the soil to displace noxious vegetation, a third shaft forwardly of said first shafts, a rotary bladed element mounted on the lower end of said third shaft in spaced relation to said discs and arcuately adjustable with respect thereto for cutting successive swaths from said row of plants to destroy surplus plants and intervening weeds.

4. A cotton thinning and weeding attachment for tractors including an elongated frame supported by said tractor for vertical adjustment, a pair of non-cutting discs rotatably supported by said frame in staggered relationship on a substantially horizontal plane and adapted to be rotated by frictional contact with the soil for successive engagement with a row of plants passing between the axes thereof, the edges of said discs overlapping a line between the axes thereof and a companion bladed element also supported by said frame forwardly of said discs and rotated by frictional contact with the soil, whereby swaths of vegetation within and that flanking said row will be removed by said bladed element as said attachment is moved along said row.

5. In a cotton chopping and thinning attachment for tractors, a frame, a pair of staggered vertical shafts suspended from said frame, a rotatable shank suspended from each of said shafts and inclined to the vertical, a non-cutting disc mounted on the lower end of each of said shanks, the edges of said discs overlapping a line between the axes thereof, a third shaft depending from said frame forwardly of said first shaft, a bladed element mounted on the lower end of said third shaft on a horizontal plane and adapted to dislodge noxious vegetation within a row of cotton and to effect thinning of the plants in said row.

JIM C. FORNEY.

REFERENCES CITED

The following references are of record in the file of this patent:

UNITED STATES PATENTS

| Number | Name | Date |
|---|---|---|
| 667,093 | Jubin et al. | Jan. 29, 1901 |
| 1,158,906 | Eccles | Nov. 2, 1915 |
| 1,493,078 | Key | May 6, 1924 |
| 1,663,065 | Verjrosta | Mar. 20, 1928 |
| 1,797,231 | Herron | Mar. 24, 1931 |
| 2,049,203 | Hebert | July 28, 1936 |
| 2,388,689 | Hebert | Nov. 13, 1945 |